United States Patent
Parker et al.

(10) Patent No.: US 10,101,942 B1
(45) Date of Patent: Oct. 16, 2018

(54) SYSTEM AND METHOD FOR HYBRID PUSH-PULL DATA MANAGEMENT IN A NON-VOLATILE MEMORY

(71) Applicant: SanDisk Technologies LLC, Plano, TX (US)

(72) Inventors: Liam Michael Parker, Edinburgh (GB); Sergey Anatolievich Gorobets, Edinburgh (GB)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 15/488,884

(22) Filed: Apr. 17, 2017

(51) Int. Cl.
G06F 3/06 (2006.01)

(52) U.S. Cl.
CPC ............ *G06F 3/0652* (2013.01); *G06F 3/064* (2013.01); *G06F 3/0608* (2013.01); *G06F 3/0613* (2013.01); *G06F 3/0647* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 8,239,639 | B2 | 8/2012 | Sinclair |
| 8,261,009 | B2 | 9/2012 | Freikorn |
| 9,021,231 | B2 * | 4/2015 | Fitzpatrick .......... G06F 11/3485 711/173 |
| 2012/0297122 | A1 | 11/2012 | Gorobets et al. |
| 2013/0061019 | A1 | 3/2013 | Fitzpatrick et al. |

OTHER PUBLICATIONS

U.S. Appl. No. 15/087,104 entitled "Method and System for Managing Data in Non-Volatile Memory", filed Mar. 31, 2016.
U.S. Appl. No. 15/394,311 entitled "System and Method of Managing Data in a Non-Volatile Memory Having a Staging Sub-Drive", filed Dec. 29, 2016.

* cited by examiner

*Primary Examiner* — Kevin Verbrugge
(74) *Attorney, Agent, or Firm* — Brinks Gilson & Lione

(57) ABSTRACT

A system and method is disclosed for managing data in a garbage collection operation using a hybrid push-pull technique. The system includes multiple non-volatile memory sub-drives associated with a specific data type and shared volatile memory garbage collection buffer sized to only receive a predetermined amount of host data of a single data type and associated large data chunk correction data. A controller identifies and accumulates valid data of a single data type from the source block and combines it with XOR data for that valid data to generate a protected data stripe in the buffer. The controller writes the protected data stripe to the sub-drive containing data of the same data type. Only after writing the protected data stripe to the appropriate sub-drive, the controller repeats the process in the same source block for the same or different data type of data.

20 Claims, 13 Drawing Sheets

SYSTEM AND METHOD FOR HYBRID PUSH-PULL DATA MANAGEMENT IN A NON-VOLATILE MEMORY

BACKGROUND

Storage systems, such as solid state drives (SSDs) including NAND flash memory, are commonly used in electronic systems ranging from consumer products to enterprise-level computer systems. The market for SSDs has increased and its acceptance for use by private enterprises or government agencies to store data is becoming more widespread. SSDs and similar storage devices utilizing block-oriented architectures share a common issue: the need to create space for writing new data by collecting sparsely distributed data into a smaller number of blocks. This process is referred to as "garbage collection". The need for garbage collection in many block-oriented storage devices is generally due to the inability to write in place to memory, and the mismatch between write granularity and erase granularity in those storage device.

The garbage collection process may introduce a significant burden on processing resources which, in turn, may reduce SSD performance. Garbage collection involves reading valid data from a block of non-volatile memory that is to be reused and writing it back to a new block. Many real-life data workloads, notably except uniform random and sequential, have different write densities for different logical areas, with some data being 'hot' or frequently written, and 'cold' or less frequently written. When data of different temperatures is mixed in the same blocks, the SSD can experience significant write amplification, where write amplification refers to the physical amount of data written or copied above the logical amount of data received.

DETAILED DESCRIPTION

Figure 1A:
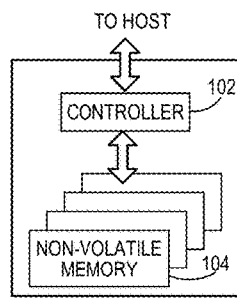
FIG. 1A is a block diagram of an example non-volatile memory system.

In order to address write amplification issues, and to reduce data management overhead burdens that can be created in addressing write amplification issues, a system and method for sorting data into different sub-drives of a non-volatile memory system during garbage collection operations is disclosed. In the disclosed system and method, the sorting may be accomplished using a hybrid push-pull garbage collection technique.

A "push" garbage collection sorting operation may involve the selection of a single source block from a sub-drive and then relocating the valid data from the selected source block to open relocation blocks in each of the other sub-drives based on data type information for the valid data and the data type associated with each sub-drive. The garbage collection operation may conclude when all the valid data from the selected source block has been relocated to the various open relocation blocks in the different sub-drives. When a non-volatile memory system uses block failure recovery mechanisms, such as large data chunk correction techniques that may include exclusive OR (XOR) protection, then this push-type of garbage collection technique requires maintaining separate data buffers, which may be random access memory (RAM) buffers such as static RAM (SRAM) or dynamic RAM (DRAM) buffers, for each open relocation block. This is because relocated data needs to be accumulated for a full block before an XOR operation may be executed on that data and the data then stored in the relocation block. Also, separate XOR engines are needed for each sub-drive with this push technique.

A "pull" garbage collection sorting technique involves filling one relocation block in a sub-drive with relocated data of the data type associated with that sub-drive before then selecting another relocation block to populate with the same or different data type. In other words, a focus in the pull technique is on pulling data from one or more source blocks into a single relocation block. The pull technique may reduce the amount of buffer space needed, and the number of XOR engines needed, because only one relocation block is open at any given time. However, the pull technique may trap data of a particular type in source blocks in the source sub-drive because a number of different blocks in the source sub-drive may be needed to assemble enough of that data type to fill the single open relocation block in a sub-drive associated with that data type. For example, if data of a particular data type only makes up, on average, 10% of the data in a given source block, then 10 source blocks would be needed to accumulate enough valid data of that type to fill a relocation block for that data type. The large amount of trapped invalid space in the source drive may then result in higher write amplification, lower endurance and lower performance generally.

Described herein is a hybrid push-pull garbage collection technique where the aim of the garbage collection operation is to empty a currently selected source block of its valid data (as in a push technique) as much as possible before looking to other source blocks for additional data rather than pull data from multiple source blocks to fill only one open relocation block (as in a pull technique). The push aspect of this hybrid push-pull technique may be accomplished by reducing the amount of data that must be aggregated to be pushed out for a given data type to a smaller portion than a complete block (or superblock). The pull aspect of this hybrid push-pull garbage collection stems from the process of only pulling data of a particular data type and accumulating that data type in a volatile memory data buffer for the relocation block, but only pulling the amount of data needed to generate the aforementioned portions of single data type data and associated large data chunk correction data, such as XOR data, generated for that data (also referred to herein as XOR stripes or superpages), where each portion is a predetermined amount of a single data type that is less than a relocation block of that data type. That pulled data from the source block is then processed through the XOR engine to add XOR data to a fixed-size volatile memory buffer that, when the fixed-size volatile memory buffer is filled with the XOR data, is used to form the XOR stripe written to the relocation block. A standard error correction code (ECC) protection may be applied to the data of the XOR stripe before writing the XOR stripe to the relocation blocks. For example, ECC protection in the form of small codewords may be generated for the XOR stripe data (both for the valid host data and the XOR data for that valid host data), to protect against smaller granularity bit errors. The described system and method thus pulls only a portion of valid data from the source block at any given time before calculating XOR protection for only that portion and writing the resulting XOR stripe to the relocation block, rather than transferring an entire block of data to a data buffer and calculating the XOR protection for that entire block at once. The non-volatile memory system can then choose the same type of data from the source block or a different type of data for relocating to the appropriate sub-drive until all the valid data is "pushed" from the current source block.

According to one aspect, a method for managing data in a memory system is disclosed. The method may include receiving host data writes at the memory system having a controller in communication with a plurality of non-volatile memory sub-drives. The method may include identifying a garbage collection trigger for a first sub-drive and, in response to identifying the garbage collection trigger, selecting a source block in the first sub-drive having valid data and obsolete data. The method may continue with sorting the valid data by data type from the source block into at least one other of the plurality of sub-drives based on the data type associated with the other sub-drives. The sorting process may include copying a predetermined amount of valid data of a first data type from the source block to a volatile memory buffer. The process includes generating larger data chunk correction data, such as XOR data, for the predetermined amount of data in the volatile memory buffer and storing the generated XOR data in a fixed-size portion of the volatile memory buffer. The predetermined amount of valid data and the XOR data from the volatile memory buffer are copied to a sub-drive predetermined to receive all data of the first data type. Only after copying the predetermined amount of valid data from the volatile memory buffer and the XOR data from the fixed-size portion of the volatile memory buffer, the process initiates copying a next predetermined amount of valid data of a single data type from the source block into the volatile memory buffer. In one implementation, the volatile memory buffer is a shared buffer for all data types, but is only usable for one data type at a time. The volatile memory buffer may be used to accumulate only a predetermined amount of data for a single data type at any given time and only a fixed-size portion of the volatile memory buffer used to store XOR data generated for that predetermined amount. After the contents of the shared volatile memory buffer are written to the appropriate sub-drive, the next batch of a same or different single data type is processed through the shared buffer.

In another aspect, a non-volatile memory system includes a non-volatile memory defining a plurality of sub-drives, a volatile memory shared by all of the plurality of sub-drives and a controller in communication with the plurality of sub-drives and the volatile memory. The controller may be configured to select a source block for a garbage collection operation from currently programmed blocks in one of the plurality of sub-drives and copy a predetermined amount of valid data of only a first data type from the selected source block to the volatile memory. The controller may also be configured to generate large data chunk correction data for the predetermined amount of valid data and write the large data chunk correction data to a fixed-size buffer in the volatile memory. The controller may then be configured to write the large data chunk correction data and the predetermined amount of valid data to a sub-drive exclusively associated with the first data type to form a protected data stripe. Only after writing the protected data stripe to the appropriate sub-drive, the controller may then copy a next predetermined amount of valid data from the source block to the volatile memory. The controller is configured to sequentially, for each given predetermined amount of valid data of a single data type in the source block, write the given predetermined amount and large data chunk correction data generated for the given predetermined amount to the volatile memory and write the given predetermined amount of data and large data chunk correction data into the appropriate sub-drive.

In yet another aspect, a non-volatile memory system is disclosed. The system may include a non-volatile memory defining a plurality of sub-drives, where a portion of the plurality of sub-drives each comprise an open relocation block. The system may also include a single garbage collection buffer in a volatile memory, the single garbage collection buffer having a total buffer capacity less than a total relocation capacity of any open relocation block. The system may include means for copying, during a garbage collection operation, a predetermined amount of valid data of a first data type from a source block to the single garbage collection buffer, as well as means for generating XOR data for the predetermined amount of data in the single garbage collection buffer. The system may also include means for writing the predetermined amount of valid data and the XOR data from the single garbage collection buffer to the open relocation block of a sub-drive of the plurality of sub-drives predetermined to receive all data of the first data type and, only after copying the predetermined amount of valid data and the XOR data from the single garbage collection buffer, copying a next predetermined amount of valid data of a single data type from the source block into the single garbage collection buffer and generating XOR data for that next predetermined amount into the single garbage collection buffer.

In different implementations, the system sorts the different data types into the appropriate relocation block of the sub-drive exclusively configured to receive only that single data type by aggregating only a predetermined amount of a single data type and generated XOR data for that aggregated data in a single shared buffer having a fixed size equal to the predetermined amount and XOR data amount, such that sets of different data types of that predetermine amount are sequentially pulled from the same source block and processed through the same fixed size volatile memory buffer into the relocation block of the appropriate sub-drive associated with that data type. In other implementations, the predetermined amount of the single data type currently being processed in the push-pull garbage collection operation described herein may be stored in any portion of the volatile memory buffer, while a fixed-size portion of the volatile memory buffer is only used to aggregate the XOR data for that predetermined mount of the single data type.

In yet other implementations, the system and method may be configured so that the garbage collection operation only uses a fixed-size portion of the volatile memory buffer, where the fixed-size portion of the volatile memory buffer is sized to receive all of the XOR data generated for the predetermined amount of the single data type, but only has space for part of the predetermined amount of the single data type. In this latter implementation, as data of the single data type is received, the data is written to the fixed-size portion of the volatile memory and then written in a piecemeal fashion to the non-volatile memory before all of the predetermined amount of data of that single data type is received. All of the XOR data generated for that predetermined data type may be accumulated in the fixed-size portion of the volatile memory buffer while the parts of the predetermined amount of the single data type are copied into the fixed-size portion of the volatile memory buffer and written into the non-volatile memory. The XOR data is then only copied into the relocation block in the non-volatile memory after all the predetermined amount of data has been received and processed to generate the XOR data.

Referring now to FIG. 1A, a block diagram illustrating a non-volatile memory system is shown. The non-volatile memory (NVM) system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, one or more microprocessors or processors (also referred to herein as central processing units (CPUs)), and a computer-readable medium that stores computer-readable program code (e.g., software or firmware) executable by the (micro)processors, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card-based system, such as a secure digital (SD) or a micro secure digital (micro-SD) card. In an alternate embodiment, memory system 100 may be part of an embedded memory system.

Although in the example illustrated in FIG. 1A NVM system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
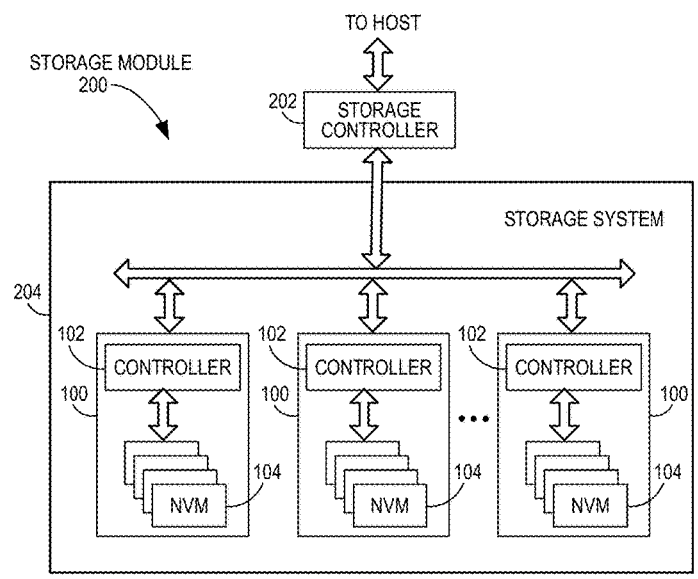
FIG. 1B is a block diagram illustrating an exemplary storage module.

FIG. 1B illustrates a storage module 200 that includes plural NVM systems 100. As such, storage module 200 may include a storage controller 202 that interfaces with a host and with storage system 204, which includes a plurality of NVM systems 100. The interface between storage controller 202 and NVM systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
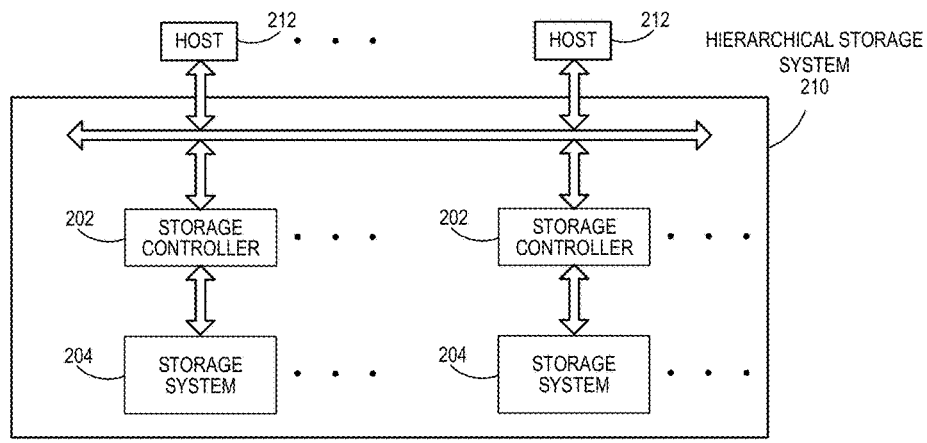
FIG. 1C is a block diagram illustrating a hierarchical storage system.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
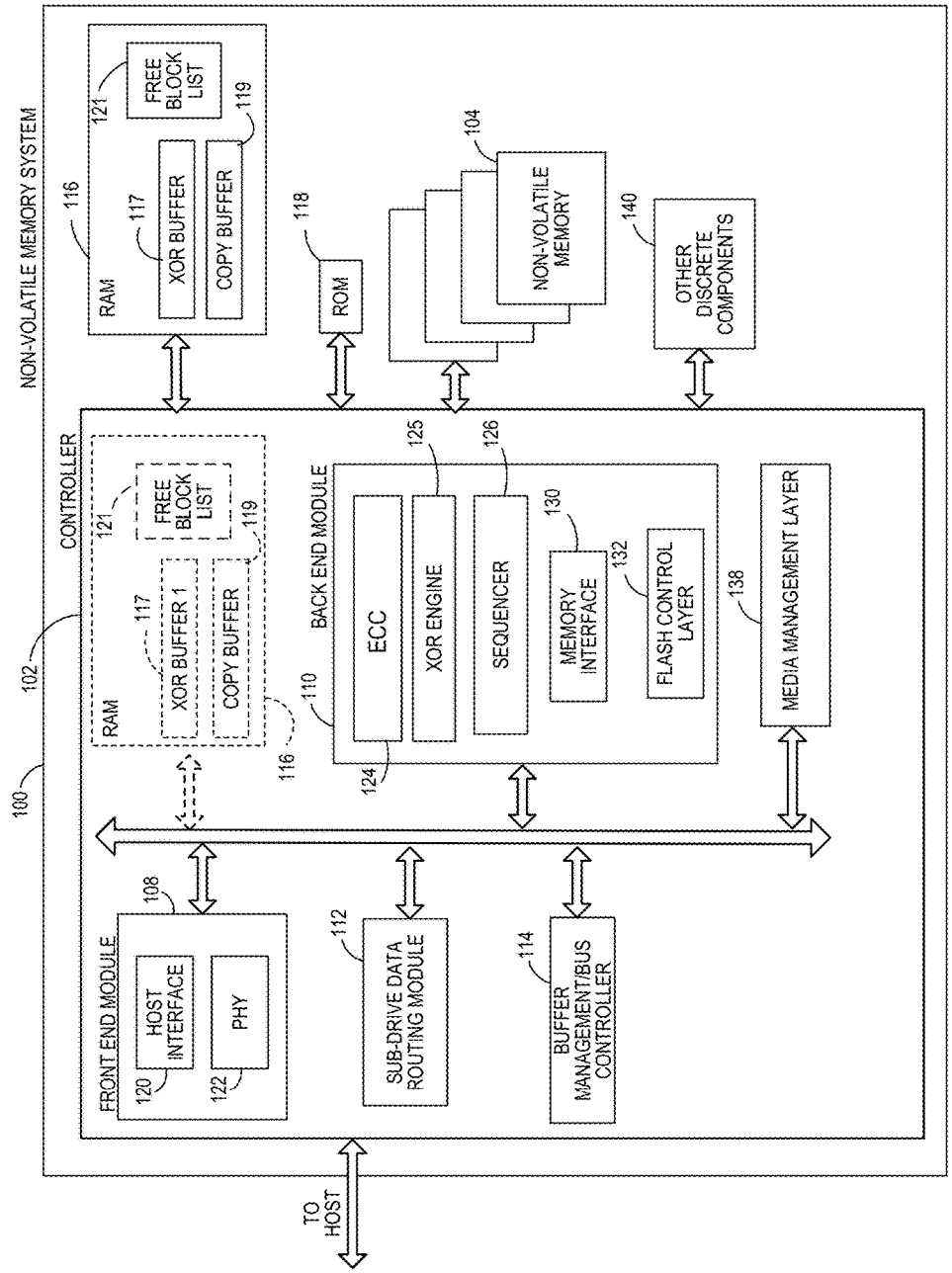
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a sub-drive data routing module 112 present on the die of the controller 102. As described below, the sub-drive data routing module 112 may provide functionality for routing data from a host only to a particular sub-drive of non-volatile memory 104 and for moving valid data at predetermined times from the particular sub-drive to other sub-drives of the non-volatile memory 104. The predetermined times may be only during garbage collection operations on the particular sub-drive. The data moved during the garbage collection operation may be valid data of a particular data type from a selected source block.

The predetermined amount of valid data of the particular data type moved in any one portion of the garbage collection operation is a block segment, where the block segment is stored in volatile memory, processed to include XOR data and the resulting combined block segment and XOR data is equal to a complete XOR data stripe in an open relocation block. After that portion of the operation is completed, where the block segment amount of valid data is moved from the source block and error correction data for that segment is generated and added to the final XOR stripe written to the relocation block, the data routing module 112 may then select the same or another data type of data from the source block sufficient to fill the next block segment of a relocation block in the same destination sub-drive (if the same data type is again selected) or a relocation block in a different sub-drive (if a different data type is selected). Thus, the technique described in greater detail below combines the pull type of garbage collection, where a predetermined amount of valid data of a single data type is relocated before another predetermined amount of valid data is moved. The technique also incorporates aspects of a push garbage collection operation in that the controller 102, via the data routing module 112, draws the block segment amounts of single types of data from the same source block until there is an insufficient amount of data of that data type to be provided from the selected source block. Also, because the block segment is a finer granularity than an entire block, the remainder of data of a particular data type in a source block left after relocating all full block segments of data from the current source block may reduce the number of additional source blocks needed to assemble enough data of a specific data type to complete the relocation of valid data from the initial source block.

As described in greater detail below, the data type information may be determined from metadata that the controller 102 receives from the host or may be metadata that the controller 102 determines regarding differences in the data. For example, if metadata is received with host data at the controller 102, then the sub-drive data routing module 112 may use that metadata to sort data during a garbage collection operation into the appropriate sub-drive. Metadata on data type received from a host may include identification of data features such as whether the data is hot or cold data or data from a particular host source or data of a particular type (e.g. database, video etc.) or, for data streams, may include data stream identifiers identifying which of two or more separate data streams incoming packets of data belong to. Alternatively, when metadata is not provided by the host regarding data type for received data, the controller 102 may look to one or more aspects of the data or its usage in the NVM system 100 to determine an attribute of the data such as data activity, also referred to as the "temperature" of that data, and then record the determined data temperature for use in sorting data of different temperatures into respective sub-drives associated with those different temperatures.

In one implementation, when the data routing module is configured to determine data type rather than utilize hints or other metadata provided to it by a host, the data routing module 112 may track activity (e.g. the number of host writes or the number of host reads) to individual logical block addresses (LBAs) individually, or at a lower granularity in predefined sections of contiguous LBAs, referred to herein as LBA blocks, in the logical address space. For the lower granularity tracking, the sub-drive data routing module 112 may then assign an average activity count, which may then be used as one measure of temperature, to all the LBAs included in that particular LBA block and, upon initiation of a garbage collection operation in a sub-drive, move data associated with a particular LBA to a physical block in the same or another sub-drive based on the temperature associated with that LBA.

The sub-drive data routing module 112 may also manage sub-drives differently in the NVM system 100 such that only one sub-drive includes an open host write block, thus is the only sub-drive accepting host data from the host. Also, all other sub-drives, except for the single sub-drive that accepts host data, include open relocation blocks for accepting data relocated from a garbage collection operation. In other words, in one implementation all data from the host must always first go to the single sub-drive dedicated to receive host data and all other sub-drives only receive relocated data from each other or the single dedicated sub-drive (referred to herein as a staging sub-drive).

A buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller. Further, in some implementations, the controller 102, RAM 116, and ROM 118 may be located on separate semiconductor die. The RAM 116 may be any of one or more types of RAM, such as SRAM or DRAM.

The RAM 116 in the NVM system 100, whether outside the controller 102, inside the controller or present both outside and inside the controller 102, may contain a number of items, including a copy of one or more pieces of the logical-to-physical mapping tables for the NVM system 100. The RAM 116 may contain an XOR buffer 117 for collecting parity data for valid data moved from a sub-drive 117 during a garbage collection process, where the XOR buffer 117 is of a fixed size that is configured to receive all the XOR (parity) data for a block segment of data of one data type, the XOR (parity) information being generated for large chunk error correction of that block segment of data, prior to the collected parity data being written to a relocation block in the designated sub-drive associated with that data type. As described in greater detail below, the XOR buffer 117 in one implementation may be of a fixed size limited to a size of a die page of the XOR data being accumulated for the plurality of die pages of host data that will make up the block segment of data. In this implementation, the valid data that makes up the block segment of host data of a single data type being moved in the garbage collection operation may be stored in any other portion of the RAM 116, such as in copy buffer 119.

Alternatively, the XOR buffer 117 may include space for all of the XOR data generated and some or all of the valid host data used to generate the XOR data. Thus, the XOR buffer 117 may be a fixed size that is as small as the size of the amount XOR data for the predetermined amount, and only contains XOR data, or in other implementations may be as large as the complete XOR stripe (the superpage that consists of all of the die pages making up the block segment of host data in addition to the die page of XOR data generated for that block segment). The RAM 116 may also include a free block list 121 indicating currently unused physical blocks available for use in the non-volatile memory 104.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A single exclusive OR (XOR) engine 125 is used to generate the XOR data for the block segment data accumulated in the XOR buffer 117. As described in greater detail below, the technique of "pulling" a block segment of a single type of data into a single buffer and processing that data in an XOR engine 125 or other form of large data chunk correction engine before then pulling another block segment of the same or different single type of data from the same source block, permits reduced sizing of RAM 116 for the XOR buffer and allows a single XOR engine 125 to be reused for different destination blocks in different sub-drives of the non-volatile memory 104.

As used herein, a large data chunk correction engine such as XOR engine 125 refers to a correction mechanism for correcting larger scale errors than the ECC engine 124. For example, the ECC engine 124 and XOR engine 125 can be used to implement techniques for recovering data that has been corrupted for some reason (for example by bad cells in non-volatile memory). The ECC engine 125 refers to hardware and/or software for applying error correction code added to small chunks of randomly read or written data, such that the resulting codeword is relatively small. Codewords are packets of data that include the host data and the ECC data generated for protecting that host data. Example sizes of each ECC codeword handled by the ECC engine 124 may include packets of host data and associated ECC data that may be 1, 2, or 4 kilobytes (Kbytes) in size. The ECC applied to the host data to create the codewords may be any one of several types of ECC, such as BCH codes (or other cyclic error-correcting codes) or low-density parity check (LDPC) codes which are useful to recover high numbers of error bits, where errors may come from individual memory cells. It is contemplated that this type of ECC is applied by the ECC engine 124 and used last before programming and first when reading.

Although, the large data chunk correction engine discussed herein, such as the XOR engine 125, is also essentially a type of error correction code or ECC, the large data chunk engine is intended to implement codes used to protect a larger chunk of data than the ECC engine 124. For example, the XOR engine 125 may be used to generate codes to protect against failure of a whole page, block, plane or even a die. So, the codes are applied on the basis of these 'chunks' so that a whole chunk can be recovered. As described herein (see for example the scenario described with respect to FIG. 13 herein), the example chunk size may be that of a die-page, so that each die-page can be recovered without using the die-page itself and the NVM system 100 can then tolerate a die failure. The XOR encoding is a simple version a code usable for large data chunk correction, where the Nth bit of every chunk is XORed to create Nth bit of XOR parity. With XOR, one can typically recover one of the chunks, but not two or more chunks. Other encoding techniques, aside from or in combination with the XOR encoding described herein, may also be suitable for the large data chunk correction engine 125. For example, a block-based ECC like Reed-Solomon (RS) may be used to recover multiple chunks of host data.

A command sequencer 126 generates command sequences, such as program and erase command sequences, to be transmitted to non-volatile memory die 104. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of NVM system 100 illustrated in FIG. 2A include the media management layer 138, which performs wear leveling of memory cells of non-volatile memory die 104 and manages mapping tables and logical-to-physical mapping or reading tasks. NVM system 100 also includes other discrete components 140, such as external electrical interfaces, external RAM, resistors, capacitors, or other components that may interface with controller 102. In alternative embodiments, one or more of the physical layer interface 122, media management layer 138 and buffer management/bus controller 114 are optional components that are not necessary in the controller 102.

Figure 2B:
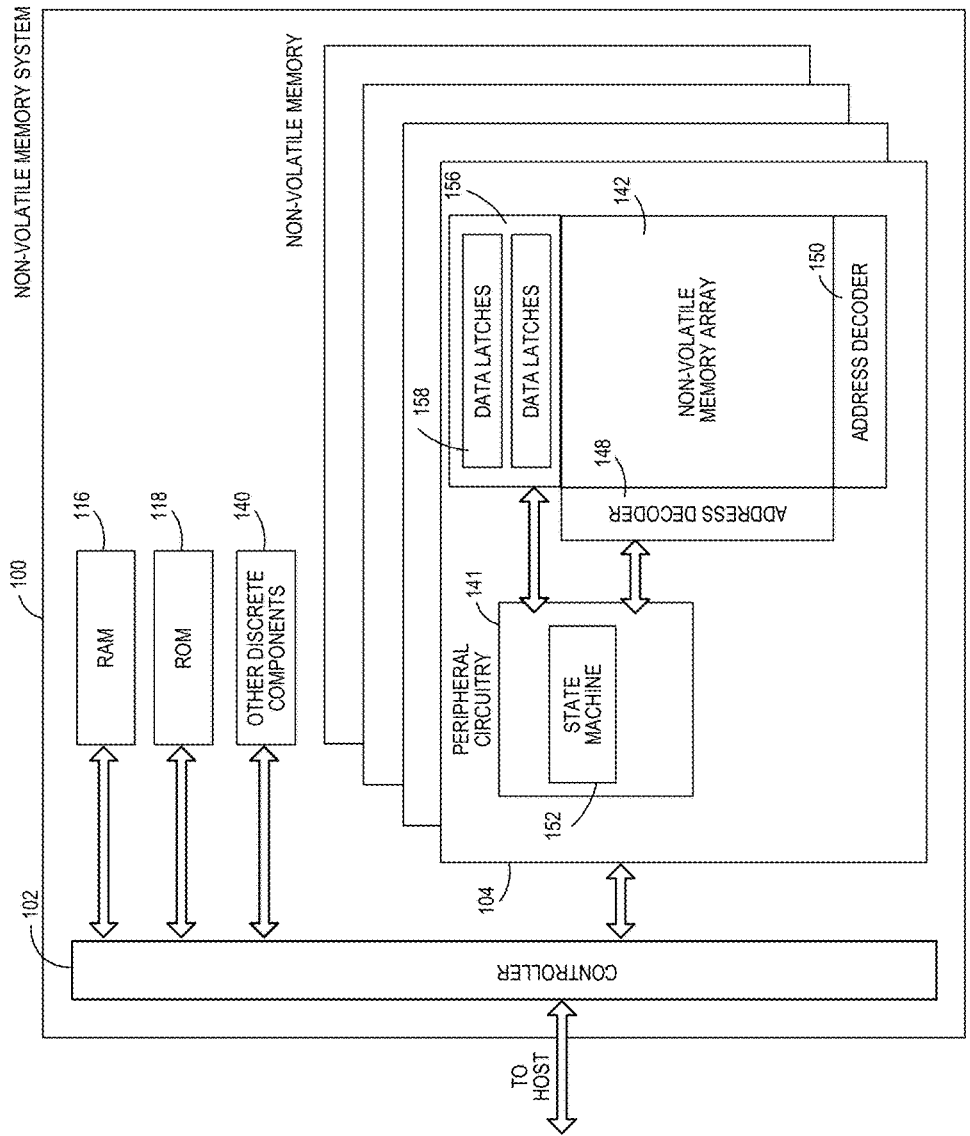
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two-dimensional and/or three-dimensional configuration. Peripheral circuitry 141 includes a state machine 152 that provides status information to controller 102. Non-volatile memory die 104 further includes a data cache 156 that caches data being read from or programmed into the non-volatile memory cells of the non-volatile memory array 142. The data cache 156 comprises sets of data latches 158 for each bit of data in a memory page of the non-volatile memory array 142. Thus, each set of data latches 158 may be a page in width and a plurality of sets of data latches 158 may be included in the data cache 156. For example, for a non-volatile memory array 142 arranged to store n bits per page, each set of data latches 158 may include N data latches where each data latch can store 1 bit of data.

In one implementation, an individual data latch may be a circuit that has two stable states and can store 1 bit of data, such as a set/reset, or SR, latch constructed from NAND gates. The data latches 158 may function as a type of volatile memory that only retains data while powered on. Any of a number of known types of data latch circuits may be used for the data latches in each set of data latches 158. Each non-volatile memory die 104 may have its own sets of data latches 158 and a non-volatile memory array 142. Peripheral circuitry 141 includes a state machine 152 that provides status information to controller 102. Peripheral circuitry 141 may also include additional input/output circuitry that may be used by the controller 102 to transfer data to and from the latches 158, as well as an array of sense modules operating in parallel to sense the current in each non-volatile memory cell of a page of memory cells in the non-volatile memory array 142. Each sense module may include a sense amplifier to detect whether a conduction current of a memory cell in communication with a respective sense module is above or below a reference level.

Figure 3:
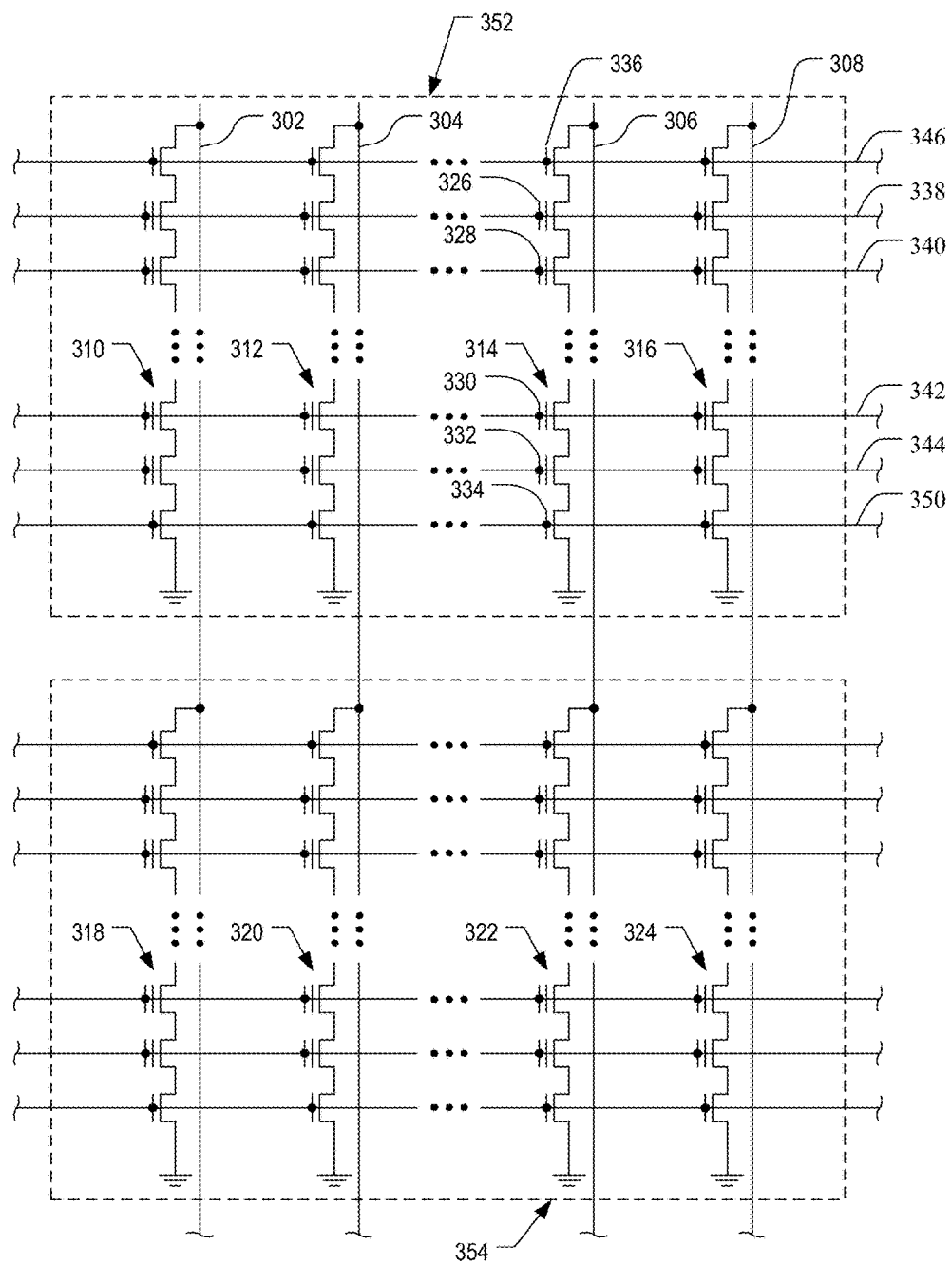
FIG. 3 is an example of a non-volatile memory circuit array illustrating block and word line arrangements.

An example NAND array is illustrated in FIG. 3. While a large number of global bit lines are provided in a NAND array, only four such lines 302-308 are shown in FIG. 3 for simplicity of explanation. A number of series connected memory cell strings 310-324 are connected between one of these bit lines and a reference potential. Using the memory cell string 314 as representative, a plurality of charge storage memory cells 326-332 are connected in series with select transistors 334 and 336 at either end of the string. When the select transistors of a string are rendered conductive, the string is connected between its bit line and the reference potential. One memory cell within that string is then programmed or read at a time.

Word lines 338-344 of FIG. 3 individually extend across the charge storage element of one memory cell in each of a number of strings of memory cells, and gates 346 and 350 control the states of the select transistors at each end of the strings. The memory cell strings that share common word and control gate lines 338-350 are made to form a block 352 of memory cells that are erased together. This block of cells contains the minimum number of cells that are physically erasable at one time. One row of memory cells, those along one of the word lines 338-344, are programmed at a time. Conventionally, the rows of a NAND array are programmed in a prescribed sequential order, in this case beginning with the row along the word line 344 closest to the end of the strings connected to ground or another common potential. The row of memory cells along the word line 342 is programmed next, and so on, throughout the block 352.

A second block 354 is similar, its strings of memory cells being connected to the same global bit lines as the strings in the first block 352 but having a different set of word and control gate lines. The word and control gate lines are driven to their proper operating voltages by row control circuits. If there is more than one plane in the system, one memory architecture uses common word lines extending between them. There can alternatively be more than two planes that share common word lines. In other memory architectures, the word lines of individual planes are separately driven. While the example NAND array illustrated in FIG. 3 has been used to describe a process for writing data to a memory block in a forward direction, to write data to a memory block in either a forward direction or a reverse direction, a controller may change which end of the memory cell strings is connected is connected a ground or other common potential.

Figure 4:
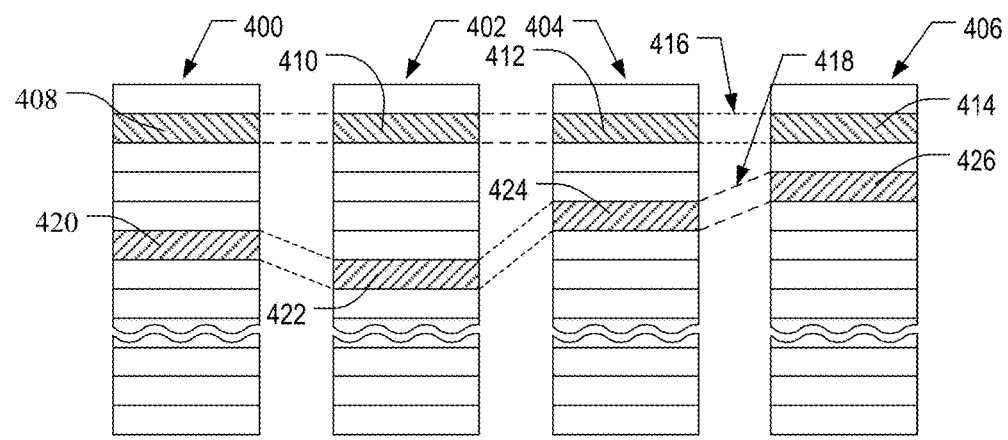
FIG. 4 illustrates an example physical memory organization of the non-volatile memory system of FIG. 1A.

The non-volatile flash memory array 142 in the non-volatile memory 104 may be arranged in blocks of memory cells where a block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 4, a conceptual illustration of a representative flash memory cell array is shown. Four planes or sub-arrays 400, 402, 404 and 406 of memory cells may be on a single integrated memory cell chip, on two chips (two of the planes on each chip) or on four separate chips. The specific arrangement is not important to the discussion below and other numbers of planes may exist in a system. The planes may be individually divided into blocks of memory cells shown in FIG. 4 by rectangles, such as blocks 408, 410, 412 and 414, located in respective planes 400, 402, 404 and 406. There may be dozens or hundreds of blocks in each plane. Blocks may be logically linked together to form a metablock that may be erased as a single unit. For example, blocks 408, 410, 412 and 414 may form a first metablock 416. The blocks used to form a metablock need not be restricted to the same relative locations within their respective planes, as is shown in the second metablock 418 made up of blocks 420, 422, 424 and 426.

Figure 5:
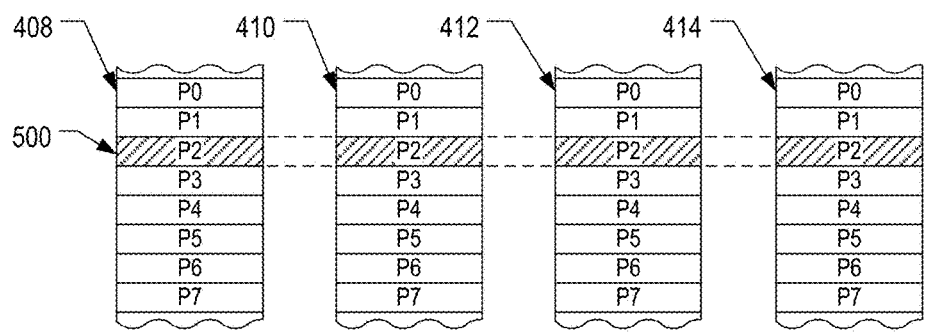
FIG. 5 shows an expanded view of a portion of the physical memory of FIG. 4.

The individual blocks are in turn divided for operational purposes into pages of memory cells, as illustrated in FIG. 5, where a page may correspond to an individual word line such as one of the word lines 338-344 of a block as shown in FIG. 4. The memory cells of each of blocks 408, 410, 412 and 414, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 500 is illustrated in FIG. 5 as formed of one physical page for each of the four blocks 408, 410, 412 and 414. The metapage 500 includes the page P2 in each of the four blocks but the pages of a metapage need not necessarily have the same relative position within each of the blocks. A metapage is typically the maximum unit of programming, although larger groupings may be programmed. The blocks disclosed in FIGS. 3-4 are referred to herein as physical blocks because they relate to groups of physical memory cells as discussed above. As used herein, a logical block is a virtual unit of address space defined to have the same size as a physical block. Each logical block may include a range of logical block addresses (LBAs) that are associated with data received from a host. The LBAs are then mapped to one or more physical blocks in the non-volatile memory system 100 where the data is physically stored.

The term superblock may be used interchangeably with the term metablock herein. A superblock is a metablock that assigns one of the constituent blocks to exclusively contain metadata regarding parity information for all of the remaining constituent blocks of the metablock. For example, each page of the designated parity block of a superblock may contain exclusive OR (XOR) data of the user data in a page of the remaining blocks of the superblock. The block in the superblock designated to contain parity data is typically the last block, but any block may be used in other implementations. Additionally, a superblock may span multiple dies, for example as many as 64 dies or higher.

Figure 6:
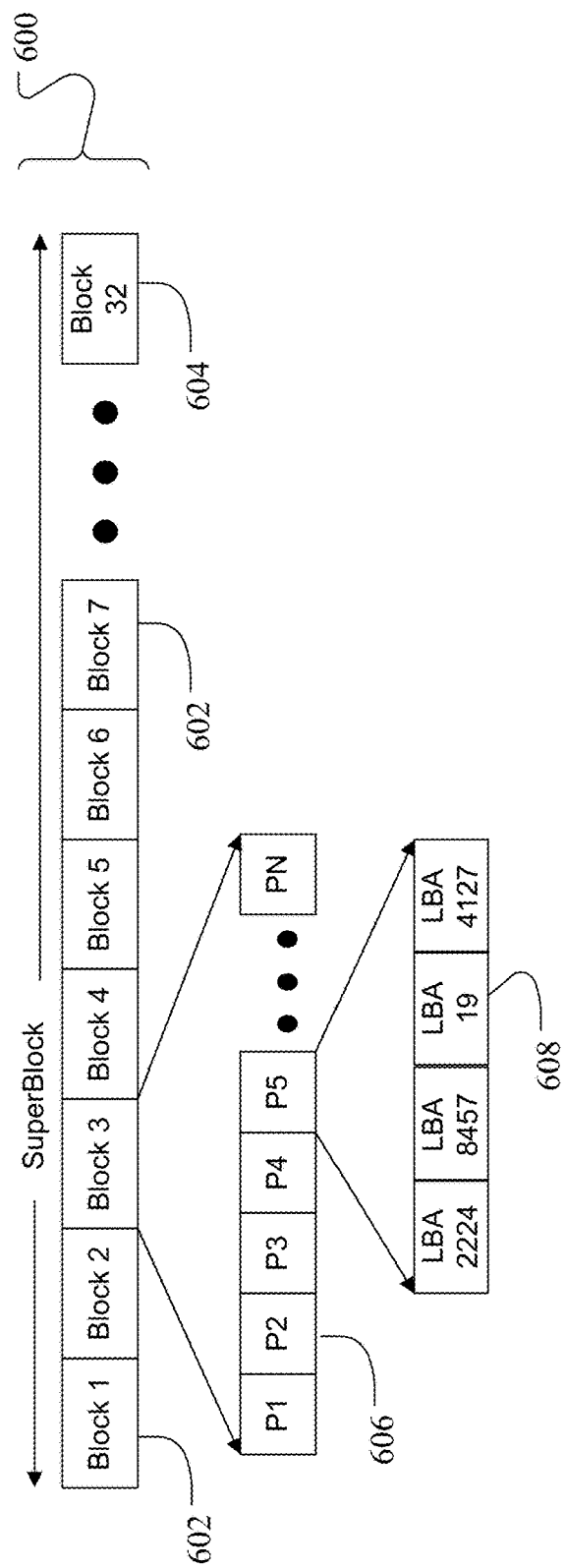
FIG. 6 illustrates is an example of a physical superblock of the non-volatile memory of FIG. 5 having multiple blocks that each have multiple pages and pieces of data associated with respective logical addresses.

Referring to FIG. 6, an example of a superblock 600 and its component parts is shown. As noted above, a superblock 600 may be a fixed number of physical blocks 602 of data as well as one XOR block 604 that contains ECC data, such as exclusive OR (XOR) data, for every page of every other block 602 in the superblock 600 to provide protection against block failure. Each block 602 is comprised of a plurality of pages 606 that each includes a plurality of pieces 608 of data. Each data piece 608 is an amount of data, for example a 4 kilobyte piece of data, that is associated with a logical block address (LBA). The LBAs shown in the example data pieces 608 of FIG. 6 are simply provided by way of example to show a situation where the data pieces 608 in a page 606 are associated with discontinuous LBAs.

Figure 7:
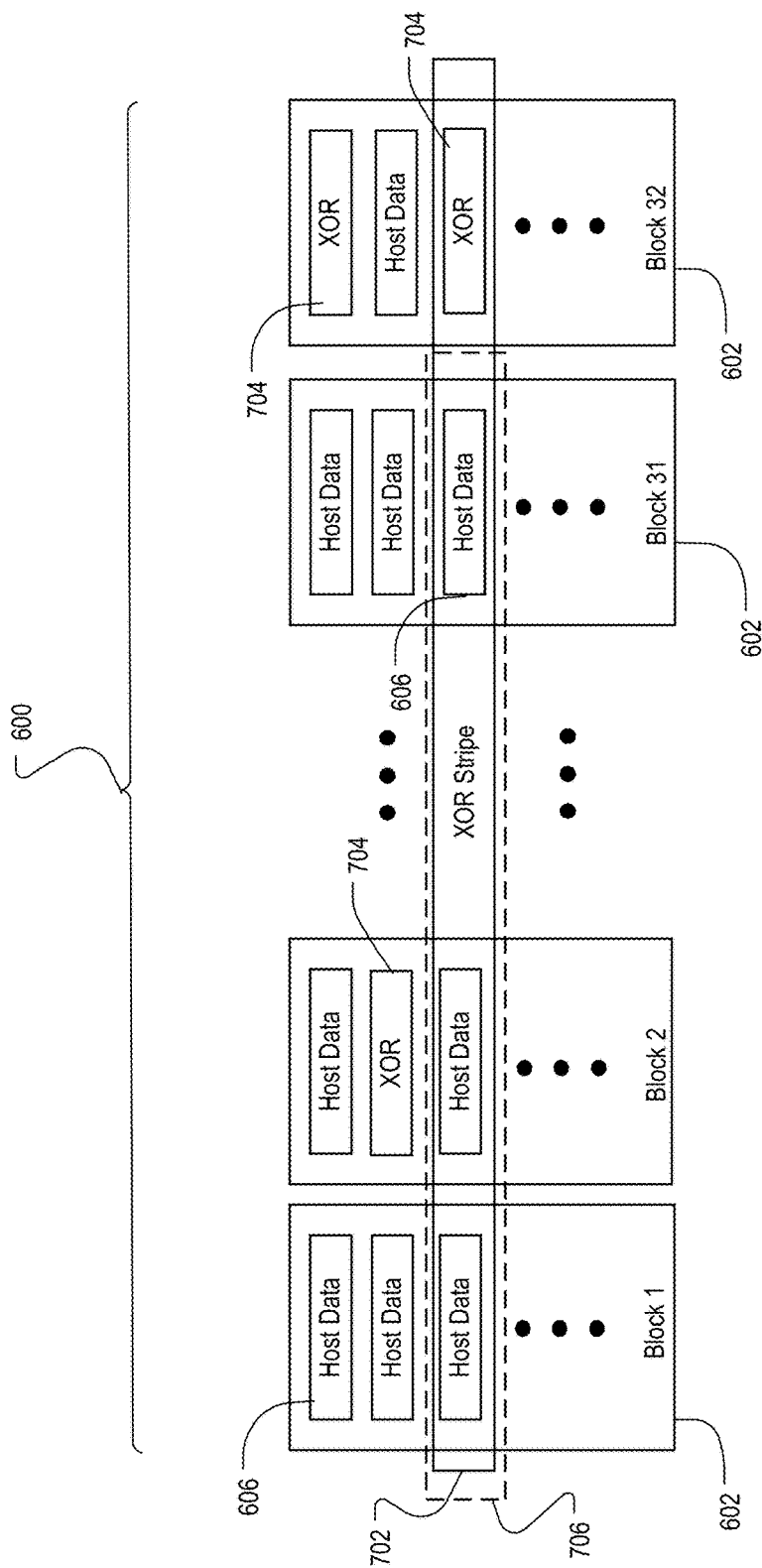
FIG. 7 illustrates is an example of a physical superblock of the non-volatile memory of FIG. 6 with an XOR stripe consisting of a metapage of host data and a page of XOR data.

FIG. 7 provides a view of the superblock 600 of FIG. 6 that illustrates the concept of a superpage (also referred to herein as an XOR stripe 702) comprising a block segment (metapage) 706 of valid host data, and the XOR data page 704 generated for the valid host data in the superpage. In one implementation, the superpage or XOR stripe 702 is the granularity of a data write to an open relocation superblock during a garbage collection operation. Each XOR stripe 702 includes, in this example, a metapage 706 of 31 host data pages 606 and one XOR data page 704. The example of using a 32 block arrangement for a superblock 600 is provided for illustration only and other predetermined sizes of superblocks 600 may be implemented in different applications. Also, although the XOR data page 704 cannot be written from the XOR buffer 117 until the complete metapage 706 of host data pages 606 have has been received, the physical block 602 in which the XOR data may be written to may be any of the physical blocks and not necessarily the last physical block in the NVM system. Also, the XOR page 704 for each XOR stripe 702 need not be written to the same physical block 602. The XOR data page 704 may be stored in any block 602 within the respective XOR stripe 702

Figure 8:
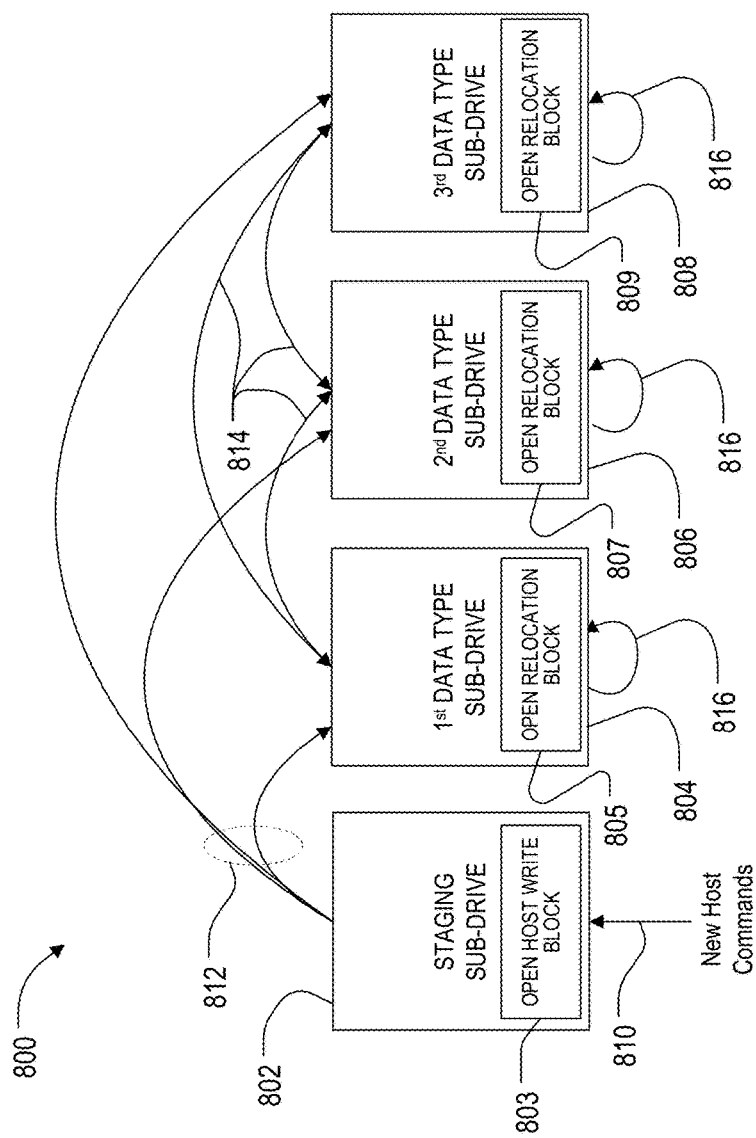
FIG. 8 illustrates a block diagram of the non-volatile memory of FIG. 2A divided in to multiple sub-drives.

In FIG. 8, a conceptual illustration of a suitable non-volatile memory 800 (corresponding to non-volatile memory 104 in FIGS. 2A-2B) is shown. The non-volatile memory 800 may be divided into sub-drives for storing data, including a staging sub-drive 802 and three additional sub-drives 804, 806, 808 configured to store data associated with LBAs determined to have particular data type. Only the staging sub-drive is shown with an open host write block 803 because, in one implementation, all host data writes are directed exclusively to the staging sub-drive 802. The controller 102 routes data being relocated in the non-volatile memory system 100 only to the other sub-drives and so no open relocation block is maintained in the staging sub-drive.

In other implementations, no separate staging sub-drive is needed and all of the sub-drives may be associated with a unique data type or data types from each other sub-drive. In different implementations, any system where there are multiple garbage collection destinations with either a single source or multiple sources of data to be relocated, and there is a restriction on the number of XOR engines or XOR buffer space, may utilize the system and methods described above. One example of a single source non-staging drive application is defragmentation. A multiple source example is garbage collection of multiple sub-drives at the same time (where multiple sources and destinations are being used at a sub-superblock interval).

Each of the sub-drives 802-808 is a collection of superblocks 600 that are managed together. There may be greater than or fewer than the number of sub-drives shown in FIG. 8 in different implementations. Also, each of the sub-drives 802-808 may exist in separate non-volatile memory die 104, the same non-volatile memory die, or each straddle multiple non-volatile memory die 104 in the non-volatile memory system 100. Each sub-drive may include only one type of memory cell, such as SLC or MLC, or multiple types of memory cells.

The routing of data from the host (not shown) to and between sub-drives is managed by the sub-drive data routing module 112 in the controller 102. In one implementation, the sub-drive data routing module 112 may be configured such that all data initially received from a host into the non-volatile memory 800 is only sent to the staging sub-drive 802. Regardless of the data type of particular LBAs of incoming data, all data being received from the host is written to the staging sub-drive and is not moved from the staging sub-drive 802 unless a garbage collection operation is needed in the staging sub-drive 802.

When a garbage collection operation is necessary in the staging sub-drive, the data routing module 112 may select a single source block (e.g. source superblock 600) in the staging sub-drive 802 and only copy the valid data to other sub-drives based on the data type of the valid data such that a sorting of valid data by data type is accomplished in the garbage collection operation. Although the source superblock 600 contains host data and XOR data for that host data, unless there is a need to recover otherwise unreadable data in the superblock 600, the XOR data is simply ignored and not considered part of the valid data in the source superblock. In one implementation, the logical-to-physical mapping table used by the NVM system 100 may be configured such that XOR data is not marked as valid data so that garbage collection will not inadvertently attempt to relocate XOR data. Also, the sub-drive data routing module 112 is configured such that, if a garbage collection operation becomes necessary in any of the other sub-drives 804-808, the valid data from the identified source superblock 600 in the selected sub-drive 804-808 may only be moved to the open relocation block in the sub-drive associated with the data type of the valid data.

As described in greater detail herein, the hybrid push-pull data management scheme for managing the garbage collection operations minimizes the buffer size and the XOR engine requirements of the NVM system 100. This may be accomplished by allowing data transfer of valid data from a source superblock via a volatile memory buffer, such as XOR buffer 117 in RAM 116, only in increments of block segments consisting of a metapage amount 706 of host data of a same data type, which is subsequently XOR-ed to generate the XOR page 704. The sum of the block segment (metapage 706) and the page of generated XOR data 704 resulting in a complete XOR stripe 702. In one implementation, the NVM system 100 only includes a single XOR buffer 117 and a single XOR engine 125. Metapages 706 of a single data type are individually aggregated from the data pieces in a selected source block and each metapage of a single data type is sequentially processed from the selected source block (or source blocks when more than one source block is needed to find sufficient data of the current data type to fill a superpage) via the single shared XOR buffer in volatile memory and via the single XOR engine 125 that will generate the XOR data to add to the valid host data and complete an XOR stripe (superpage) 702 in the desired relocation superblock 600 of the appropriate data type sub-drive.

More specifically, in one implementation valid host data of a single data type is accumulated in the volatile memory (RAM 116) and the generated XOR data for that valid host data is accumulated in the fixed-size XOR buffer 117, until a metapage 706 of a predetermined size of that single type of data is acquired, and processed in the XOR engine 125 to obtain a XOR page 704. That XOR page 704, once fully accumulated in the XOR buffer 117, is then written into the open relocation block of the sub-drive associated with the data type of the data to complete the superpage 702 (XOR stripe).

After filling the XOR buffer 117 with XOR data and then writing that XOR data to the relocation block to complete the XOR stripe, the XOR buffer is released and available for new XOR data generated for a next batch of valid data from the source block. The next batch of valid host data is of a single data type that may be the same or different data type as the previous superpage, is copied into RAM 166 and processed through the XOR engine 125 into another XOR stripe 702 that is copied into the open relocation bock of the sub-drive associated with the appropriate data type. This sequential processing and storing of only a portion (e.g. individual superpages) of the valid data from a source block into a volatile memory buffer and writing that portion to the appropriate relocation block can avoid the need for separate volatile memory buffers for all of the sub-drives that becomes necessary when all of the valid data in a source block is pushed out at one time and only processed when an entire superblock of a particular data type has been accumulated. The pulling of a single data type of valid host data from the source block in relatively small quantities into the volatile memory buffer 116 and then processing and writing the processed host data and XOR data that form the resulting XOR stripe into the appropriate relocation block, may reduce the number of source blocks that are necessary to accumulate the amount of valid data of a single data type as compared to traditional pull operations where an entire superblock of data needed to fill a relocation superblock must be aggregated from multiple source blocks.

An example of data flow possibilities into and between the sub-drives 802-808 of the non-volatile memory 800 are shown in FIG. 8 for one implementation. All host data 810 enters into the staging sub-drive 802 and no other sub-drive receives data directly from the host. When a garbage collection operation is initiated in the staging sub-drive 802, all valid data in the superblock selected as source superblock for the operation within the staging sub-drive 802 is transferred to one or more of the other sub-drives 804-808 along an appropriate one of data paths 812 from the staging sub-drive 802. The selection of the destination sub-drive 804-808 for each piece of valid data relocated from the staging sub-drive 802 is based on the data type assigned to or determined for the LBA associated with the piece of data. No open relocation superblocks are supported in the staging sub-drive 802 and thus no relocation of data back to another superblock within the staging sub-drive 802 is permitted in one implementation such that a garbage collection operation in the staging sub-drive 802 always results in valid data being relocated to another sub-drive 804-808.

In contrast, when a garbage collection operation is initiated in any other of the sub-drives 804-808, the valid data of the selected source superblock(s) from the identified sub-drive 804-808 may be relocated within the identified sub-drive or to any sub-drive other than the staging sub-drive, as indicated in relocation paths 814 and 816. Again, the individual pieces 608 of valid data from a selected source superblock 600 are moved to a particular sub-drive based on the data type of the LBA associated with that piece 608 of data and only in amounts of a superpage of a same data type and its XOR data, rather than a superblock, at any given moment.

The data type or types assigned to each sub-drive 804, 806, 808 in the NVM system 100, other than the staging sub-drive 802 which has no assigned data type in one embodiment, may be set to predetermined values at the time of manufacture. Each data type may only be assigned to one of the sub-drives in one implementation. In alternative embodiments, the controller 102 may use an adaptive algorithm to search for optimized data types to assign to each sub-drive 804, 806, 808. Examples of static data types may include data stream identifiers, file types (based on file extension data provided to or determined by the NVM system 100) or other data types that do not change once assigned. One example of a data type based on dynamic criteria is data "temperature", where temperature may be the frequency with which data at a particular LBA is accessed or written to. Other data types, such as random or sequential data, may also be sorted into respective sub-drives in different embodiments.

The sub-drives 804, 806, 808 other than the staging sub-drive 802 may be associated with data of only a single data type, where each sub-drive contains a data type that is different than each other sub-drive's data type, or the sub-drives may each be exclusively associated with a plurality of unique predetermined data types, where each of the predetermined data types may only be found in one of the sub-drives. The assignment of data types to sub-drives may be static or dynamic in different implementations. For example, if the data types assigned to each sub-drive are associated with "temperature" as defined above, each sub-drive may be assigned a fixed temperature range that remains static over the life of the NVM system or the temperature ranges exclusively associated with the sub-drives may be dynamically revised over the course of usage of the NVM system 100 based on the changing distribution of the temperatures.

Figure 9:
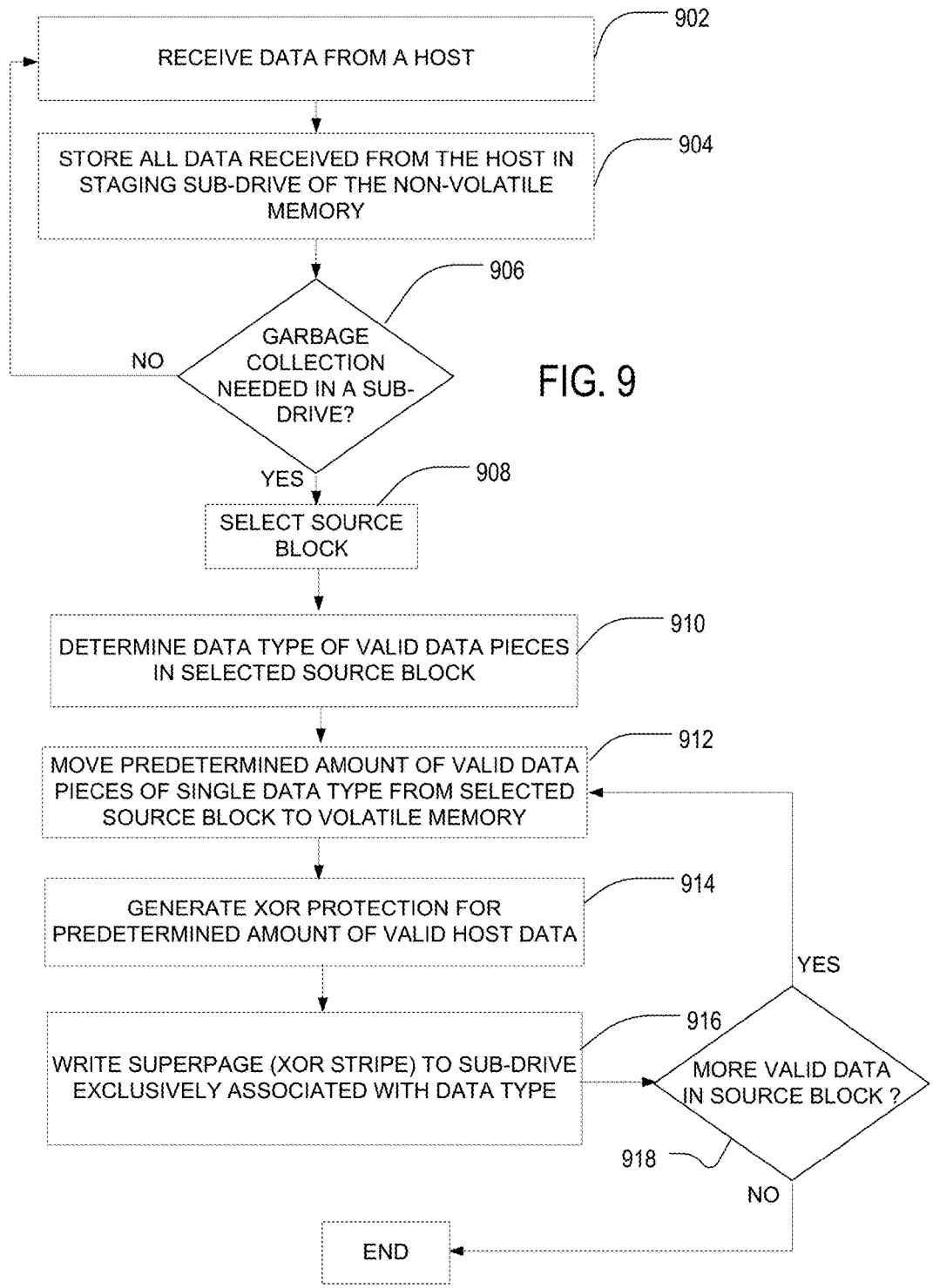
FIG. 9 is a flow diagram illustrating one implementation of managing data flow in a non-volatile memory such as shown in FIG. 6.

A method of utilizing the NVM system 100 with sub-drives and data structures described above is illustrated in FIG. 9. Referring to FIG. 9, a flow chart describing an implementation of the data flow in sub-drives 802-808 of the non-volatile memory 800 is described. Data is received from a host and the sub-drive data routing module 112 of the controller 102 only routes received host data for storage at the staging sub-drive 802 (at 902, 904). As noted above, in one implementation only the staging sub-drive 802 is configured with an open host write superblock 803 to receive the host data and XOR data generated by the XOR engine 125 for that host data and none of the other sub-drives 804, 806, 808 are configured to receive host data directly such that no additional host write blocks need be maintained aside from the one in the staging sub-drive 802. Periodically, for example after every host write to the staging sub-drive 802, the controller 102 may determine whether a garbage collection operation is needed for any of the sub-drives 802-808 (at 906). One suitable garbage collection trigger may be the number of free blocks in the non-volatile memory 104 as a whole falling below a predetermined minimum value. If the controller 102 detects that too few free blocks are available based on the free block list 121, then a garbage collection operation may be initiated. Another garbage collection trigger may be an amount of overprovisioning in a sub-drive exceeding a predetermined threshold, where overprovisioning of a sub-drive is defined herein as the ratio of physical storage capacity to valid data. The number of free blocks or the overprovisioning level are just some examples of garbage collection triggers and different or additional garbage collection triggers are contemplated.

Once triggered, first steps in the garbage collection operation are to determine the sub-drive in the non-volatile memory 104 where the garbage collection operation is needed, and then to select a source superblock 600 from that sub-drive (at 908). One sub-drive selection process may include selecting the sub-drive that has more than a predetermined number of invalid pages. Any of a number of sub-drive selection criteria may be used in different implementations. Once a sub-drive is identified, then a source superblock may be selected from that sub-drive. Source superblock selection may be based on any of a number of criteria such as the least recently written superblock, the superblock with the most obsolete data, or based on different or combined selection criteria.

Regardless of the sub-drive and superblock selection process utilized, when a source superblock 600 is selected by the controller 102 and the data type of each valid data piece 608 in each block 602 of the source superblock 600 is determined (at 910). The NVM system 100 may be configured to sort any of a number of predetermined data types during a garbage collection operation into a sub-drive predetermined to receive that data type. For example, data type information, such as file type, data stream affiliation (for streamed data), access frequency ("temperature"), random or sequential data, and any other data type characteristic may be sorted. The determination of the data type for the predetermined data types being sorted in the NVM system 100 may be accomplished by interpreting metadata received from a host with the data, for example data header information accompanying the received data in the staging sub-drive 802, or may be generated from observation of data usage, for example tracking data access frequency of data in the NVM system 100 by the controller 102.

After identifying the predetermined different data types in the valid data pieces in the selected source superblock 600, the controller 102 determines how many complete metapages 706 of a predetermined size, in other words the non-XOR data portion of an XOR stripe 702, of each data type can be assembled from the available valid data pieces 608. The controller 102 next selects a data type having a complete metapage 706 of data, and copies that data to the volatile memory (RAM 116) shared by the sub-drives (at 912). As each page of the valid data of the selected data type is accumulated in the volatile memory, such as in copy buffer 119, the XOR engine 125 (FIG. 2A) generates a portion of an XOR data page 704. Each valid data page may be immediately written to the XOR stripe 702 being assembled in the appropriate sub-drive, or in other implementations all of the pages of valid data for the XOR stripe 702 may first be accumulated in volatile memory and only written to the XOR stripe 702 when the XOR data in the XOR buffer 117 is complete (at 914). The controller 102 completes writing of the XOR stripe 702 into the open relocation block 805, 807, 809 of the appropriate sub-drive by writing the XOR data from the XOR buffer 117 (at 916). The controller 102 may select a same or different data type from the source superblock and repeat the process of pulling that data type from the source superblock and generating XOR data for that data, if more valid data remains in the selected source block (at 918).

In implementations where the XOR buffer 117 in volatile memory 116 is sized to hold an amount of data (host and generated XOR data) corresponding to an entire XOR stripe 702, then all of the pages 606 of host data of the selected data type and the associated XOR data 704 may be first cached in the XOR buffer 117 and then written to the non-volatile memory at one time after the last of the host data is received and the XOR data generated for that XOR stripe. Alternatively, after each page 606 or other smaller increment of the host data for the XOR stripe 702 is received and parity information is generated for that page or smaller increment of received data, the page or smaller increment of received data may be stored in a general location in RAM 116 other than the fixed-size XOR buffer 117. The page or smaller increment may be copied from RAM 116 into non-volatile memory in piece-meal fashion before all of the data for that XOR stripe 702 has been received, while the XOR data generated for that data is accumulated in the fixed size XOR buffer 117. In yet other implementations, where the fixed-size XOR buffer 117 is sized to hold all of the XOR data for an XOR stripe and all or a portion of the valid host data for the XOR stripe, the entirety of the host data and generated XOR data may first be accumulated in the XOR buffer 117 before being written to the XOR stripe in non-volatile memory.

It is contemplated that a maximum size for an efficient XOR buffer 117 is an amount of space equal to a single XOR stripe 702 and that a minimum size of the XOR buffer 117 may be an amount of space equal to the XOR data page 704 (sometimes referred to as the XOR context) that is generated for the XOR stripe 702 and all of the valid host data for the XOR stripe 702 is stored in other available space in RAM 116. In implementations where the XOR buffer 117 is at a minimum size as noted above, the XOR data may be calculated and updated for each individual host data page 606 that is received in RAM 116. A host data page 606 may then be immediately written to non-volatile memory 104 before a next host data page is processed, while the latest XOR data generated in the XOR engine 125 is retained in the XOR buffer 117 and added to the prior accumulated parity information in the XOR page 704 for that XOR stripe 702. The XOR data page 704 may be written to non-volatile memory 104 only after the last host data page 606 for that XOR stripe 706 has been received.

In one embodiment, the fixed-size XOR buffer 117 in RAM 116 may be separate from the portion of RAM 116 used to store the host data pages 606 of each XOR stripe 702. In this implementation, the RAM 116 may store host data of the single data type being used to generate the current XOR stripe 702 in any available location in RAM 116 while accumulating the XOR data for the single type of data corresponding to the single data type being accumulated for the current XOR stripe 702 in the XOR buffer 117. The single XOR buffer 117 would be limited to the current XOR stripe and released after all of the host data pages for the XOR stripe 702 had been received. The host data pages for that XOR stripe 702 may have been written to non-volatile memory as they were received and processed, or accumulated and written at one time after they had all been accumulated.

The amount of host data that is designed to be protected in the NVM system 100 may dictate the fixed size selected for the XOR buffer 117. In the example of FIG. 7, the amount of data being protected by the XOR data is a die page (data page 606). In that instance, the amount of space reserved in the XOR buffer 117 for the XOR data (or the total size of the XOR buffer 117 if only XOR data is to be stored in the XOR buffer) is a page. If protection was desired for two host data pages, then the XOR buffer 117 would need to include two pages for XOR data. Assuming a limited amount of overall RAM 116 in the memory, configuring the fixed-size XOR buffer 117 to have more RAM space would take away from the RAM left for the copy buffer 119 to use to hold the valid data of the single data type being processed.

In one embodiment, all complete metapage 706 quantities of each data type are sequentially copied into RAM 116, an XOR stripe 702 is generated where the XOR page 704 portion of the XOR stripe 702 is generated from an XOR operation on the metapage 706 of single data type valid data of the source superblock, and the XOR stripe 702 is completed in the appropriate open relocation superblock 805, 807, 809 when the complete XOR data from the XOR buffer 117 in RAM 116 is written into that appropriate open relocation superblock. This sequence may proceed during garbage collection of the selected source block for all complete metapage increments of a first data type before proceeding to garbage collect all complete metapage batches of data of a second data type. This sequential storing and processing via the single XOR buffer 117 and single XOR engine 125 and storage of the resulting XOR stripes may be repeated until all complete metablock batches of each data type present have been sequentially processed. Alternatively, rather than processing all complete metablock batches of one data type before proceeding to processing all complete metablock batches of data of a next data type, the controller 102 may interleave creating and storing XOR stripes for complete metablock batches of each data type.

Figure 10:
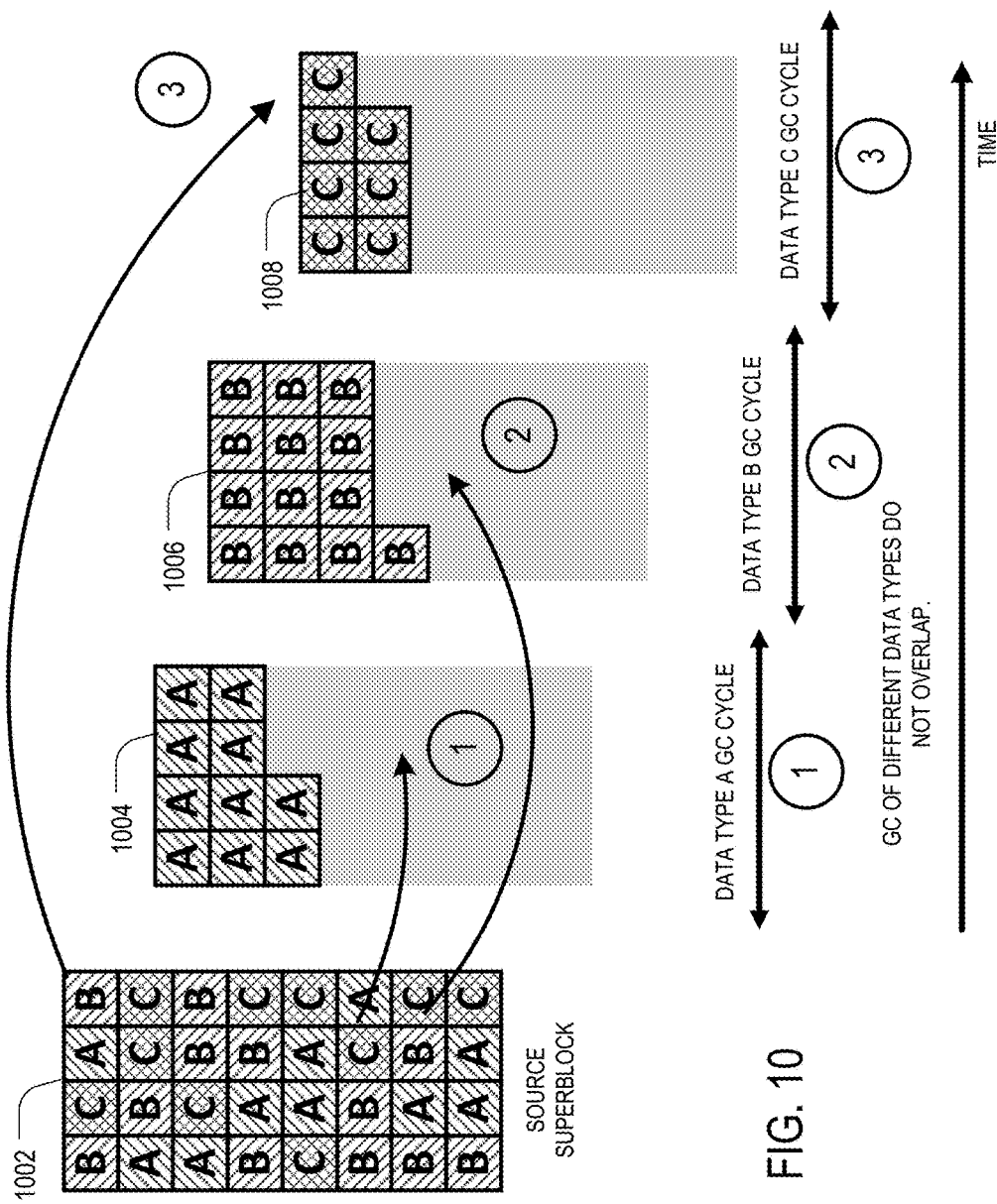
FIG. 10 illustrates a hybrid push-pull version of garbage collection sorting with a sequence of interleaved XOR stripe of data writes of a different data type sorted from a source superblock into respective open relocation superblocks of respective different sub-drives.

Referring to FIG. 10, a simplified illustration of interleaving garbage collection of different data types in a source superblock 1002 is shown. In this example, XOR stripes 702 of separate data types are interleaved from a source superblock 1002 where a first garbage collection cycle of generating an XOR stripe 702 of data type A with the single XOR buffer 117 and single XOR engine 125 and storing it in an open relocation block 1004 associated with data type A is followed in time by a second garbage collection cycle of data type B to relocation block 1006. Subsequently, the controller 102 may then pull data of data type C to generate an XOR stripe 702 of data type C and store it in relocation block 1008, where each relocation superblock 1004, 1006, 1008, is in a separate sub-drive associated with the respective data type. This sequence of moving XOR stripes 702 of data of type A, followed by type B and then by type C may repeat until all complete metablock batches of valid data of each data type have been exhausted. Other interleaving patterns of different data type XOR stripes 702 is also contemplated. It should be noted that the garbage collection operation for each data type does not overlap in this implementation because a single XOR buffer 117 in volatile memory 116 is available and a single XOR engine 125 is used such as shown in FIG. 2A.

Figure 11:
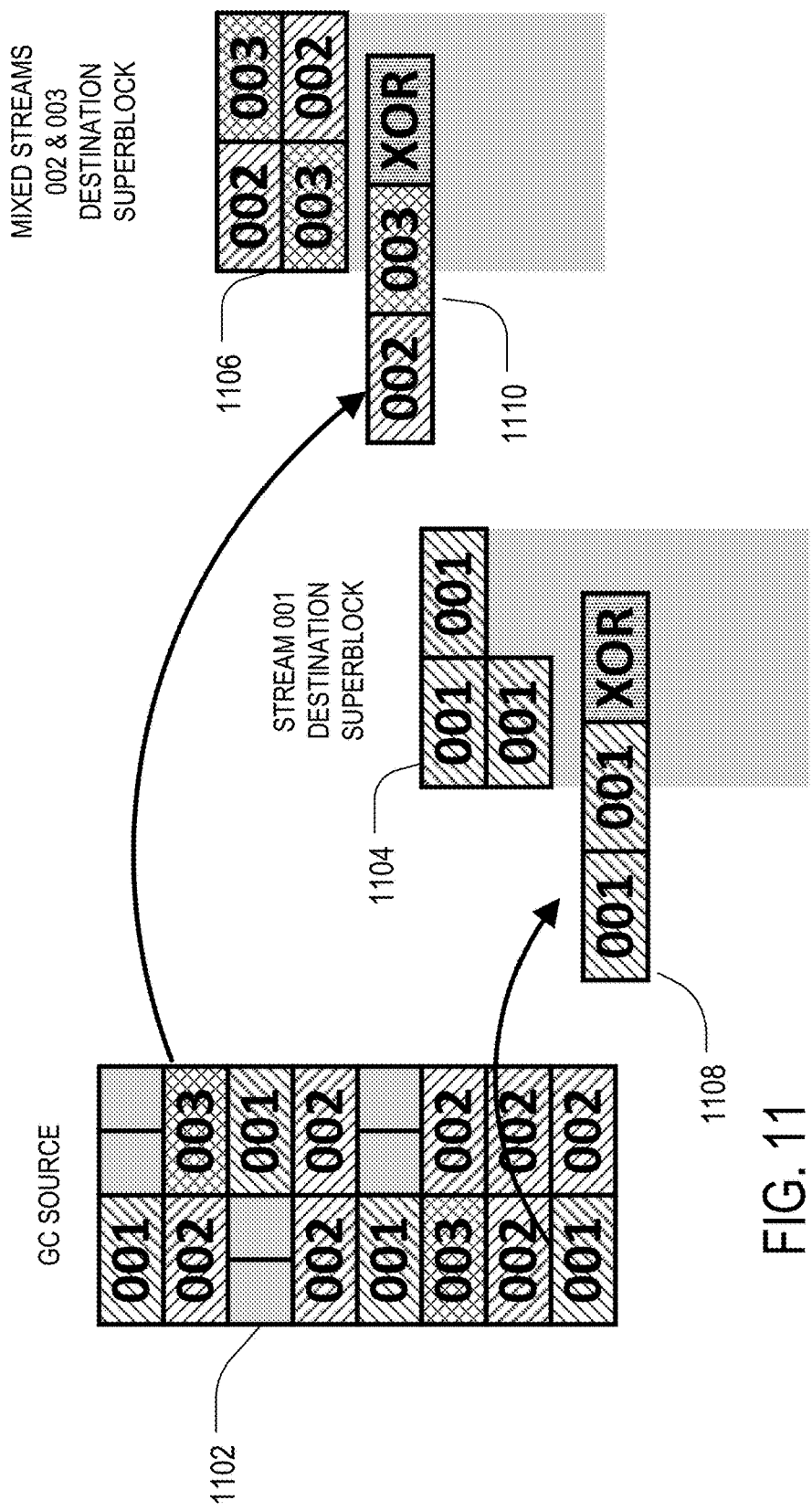
FIG. 11. illustrates an alternative version of hybrid push-pull garbage collection with interleaved XOR stripe writes for streamed data.

Other forms of data type sorting during garbage collection using the push-pull techniques described above may include associating certain sub-drives with a single data type while associating other sub-drives with a multiple data types that each differ from the data type or data types exclusively associated with any other sub-drive. For example, as illustrated in FIG. 11, if the data type being sorted is based on a data stream identifier, such as streamed video data of different sources or files, there may be some streams that are too sparse to efficiently provide complete metablock batches that fill up an XOR stripe. In those instances, the benefit of separating such sparse streams into unique relocation blocks may be limited. Accordingly, relocation superblocks in one sub-drive, such as relocation block 1104 may be dedicated to receive XOR stripes 1108 of a larger stream (stream 001), while a relocation block 1106 in a different sub-drive may be associated with multiple mixed data streams (streams 002 and 003) that are assembled into mixed XOR stripes 1110. The push-pull technique described above would be implemented as described previously but with XOR stripes for the mixed stream relocation block (and associated sub-drive) including multiple predetermined data stream types. The data type may be provided by host hints in, for example, the header of one or more pieces of data, or may be determined by the controller 102 using any of a number of predetermined observation methods. Data streams, for example, may be identified by a tag sent by the host as the data is written.

Figure 12:
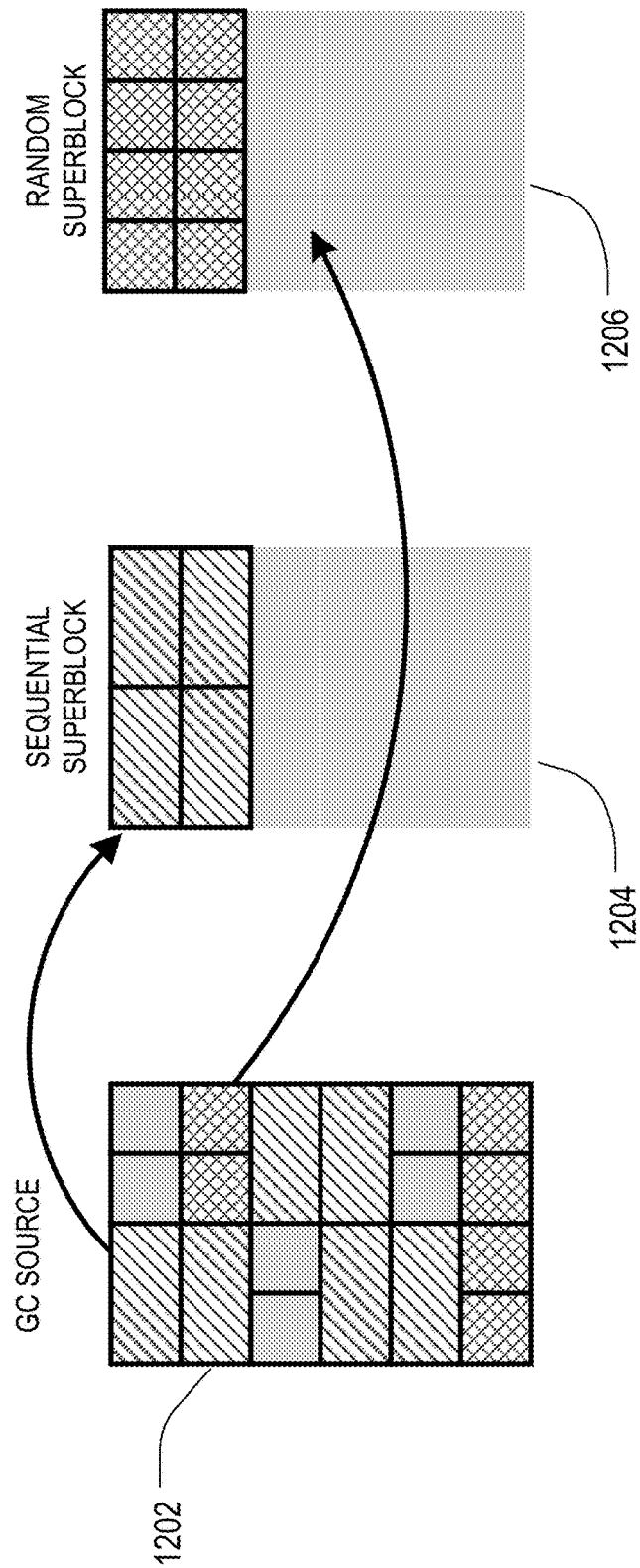
FIG. 12 illustrates an alternative version of the hybrid push-pull garbage collection technique where the sub-drives are assigned random or sequential data from a source block.

As illustrated in FIG. 12, even if metadata or other host hints is limited to logical block addresses (LBAs) or other logical-to-physical address information, the NVM system 100 may be able to detect that there is considerable sequential data in a block in a sub-drive, such as a staging sub-drive, that is mixed in with random data. For purposes of this disclosure, random data may be considered data having LBA sequence with less than a predetermined number of contiguous logical addresses. For example, a die page (e.g. 32 Kbyte) worth of contiguous LBA data may be considered to be sequential in one implementation and may be separated from data written randomly in less than die page chunks. When a garbage collection operation is triggered and a sub-drive and source block 1202 are selected, the controller 102 may then use the limited LBA information to separate the sequential data and random data into respective XOR stripes 702 that are then written to a sequential relocation block 1204 in a sub-drive dedicated to receiving sequential data, or to a random data relocation block 1206 in a sub-drive dedicated to receive only random data, respectively.

Regardless of the data types separated into separate relocation blocks and associated sub-drives, or of the interleaving technique used to switch between XOR stripes 702 of different data types, in one implementation, for the remainder data of each data type in the source block after all the complete metablock batches of each data type have been garbage collected, a next source block may be selected from which to accumulate complete metablock batches and generate XOR data stripes for that remainder data in the original source block. In this way, the original source block may have all of its valid data garbage collected so that the original source block may be placed in the free block list for re-use before proceeding to move complete metablock increments of the various data types in the next source block. Thus, as noted above, after all valid data pieces 608 from a selected source superblock 600 have been relocated to appropriate sub-drives in XOR stripe 702 increments, the source superblock 600 may be added to the free block list 121 maintained in RAM 116. Blocks in the free block list 121 may be later used in any of the sub-drives as needed.

An NVM system 100 with, in one implementation, a single XOR buffer 117 in volatile memory 116 has been described, along with a single XOR engine 125 for generating XOR data for each XOR stripe of a predetermined data type or predetermined data types. This NVM system architecture may be accomplished with a push-pull garbage collection technique as described above that minimizes trapped over-capacity by individually and sequentially processing XOR stripes of smaller size. The smaller size XOR stripes, as compared to waiting to perform XOR protection until a complete block of data of a data type has been accumulated, may permit the emptying of a source block more quickly by requiring less aggregation of a particular data type before that data type can be written to a destination sub-drive.

Figure 13:
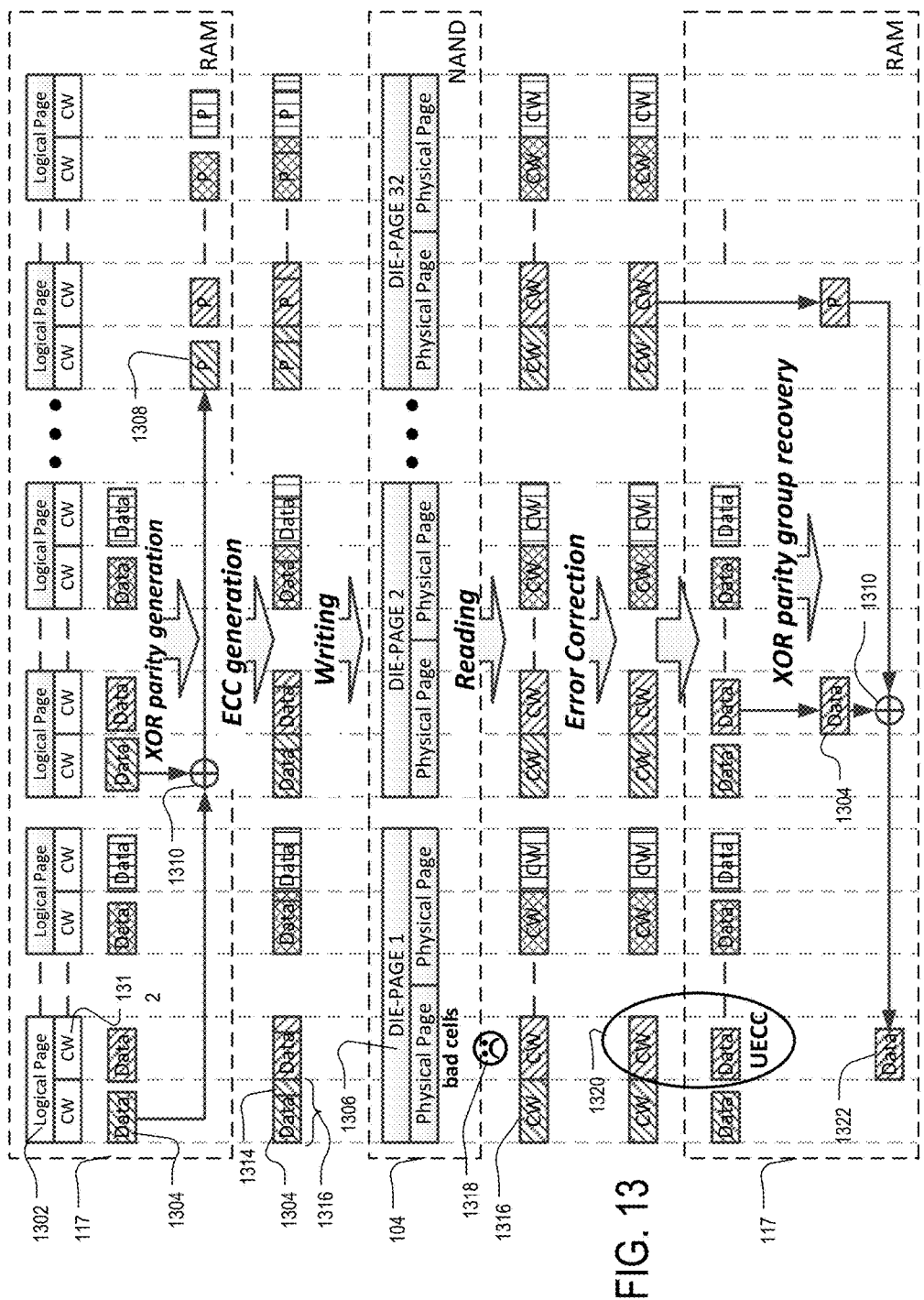
FIG. 13 is an example flow of the hybrid push-pull technique illustrating correction of a corrupted page in a superpage.

An example of how the large data chunk correction data in the hybrid push-pull arrangement discussed above may be used in conjunction with the smaller scale ECC protection is shown in FIG. 13. The flow in FIG. 13 includes both an example order of operations for writing data (for example, copied from one or more source superblocks as described above) and for reading data in one implementation. The particular example of FIG. 13 starts with the writing of data using the push-pull technique described above, and then illustrates how data may be recovered with the large chunk data correction of the XOR protection to data has been corrupted beyond the ability to correct of the additional smaller scale ECC protection, also referred to as an uncorrectable ECC or UECC error.

Referring to FIGS. 2A and 13, as data 1304 from the same logical position of each logical page 1302 is written into the XOR buffer 117 of RAM 116, XOR data, also referred to as the parity group (P) 1308, is generated by the XOR engine 125. This XOR data 1308 is formed as the first step in the data writing sequence by performing XOR operation 1310 in the XOR engine 125. All data 1304 in each codeword's 1312 data load 1304 in each die-page 1306 is XOR-ed 13, before an ECC is generated. The ECC is then generated via the ECC engine 124 in an ECC generation step to generate new codewords 1316.

In the process illustrated in FIG. 13, the data 1304 being XOR-ed together from the original codewords 1312 are shown as having the same background pattern, as well as the corresponding XOR data (P) 1308. Then, an ECC is generated for the initial data 1304 and XOR parity data 1308. The initial data 1314 and the associated ECC data generated in the ECC engine 124 and added to the initial data 1314 form the new ECC codeword 1316. The codewords 1316 are then each written to the appropriate page 1306 in non-volatile memory 104. The XOR data 1308 is also processed through the ECC engine 124 to generate new codewords 1316 that are also stored in the non-volatile memory 104 to complete the XOR stripe as discussed previously.

Continuing down the flow path in the example of FIG. 13, when data from the XOR stripe is read the codewords 1316 are first read out of the non-volatile memory 104 and then processed through the ECC engine 124 to correct for any of the smaller scale errors that may be discovered in the data 1304 of the codeword during the read process. If there are bad cells 1318 discovered in one of the physical pages making up a die page 1306, and an error 1320 uncorrectable by the ECC data 1314 of the codeword 1316 is found, then the large data chunk correction data, here the XOR parity, may be used to recover the data via the XOR engine 125. In the example of FIG. 13, all other codewords' data with the same offset in a die-page (indicated by the same background pattern in FIG. 13) may be read from all other die-pages 1306 in the XOR stripe (also referred to as the parity group). After all of those other codewords 1316 have passed the initial error correction step via the ECC engine 124, the data portions 1304 are XOR-ed together in an XOR operation 1310 at the XOR engine 125 to produce the recovered codeword's data load 1322.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two-dimensional memory structure or a three-dimensional memory structure.

In a two dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three-dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional exemplary structures described but cover all relevant memory structures within the spirit and scope of the invention as described herein and as understood by one of skill in the art.

Methods and systems have been disclosed for managing received data and sorting data by predetermined data types, during a garbage collection operation, to sub-drives in non-volatile memory each predetermined to receive all data of a respective data type or data types. The system and method may permit reduction in the number of source blocks trapped during garbage collection by utilizing a small XOR stripe size that is a portion of the size of the destination relocation block, but permits application of block protection XOR data to that smaller size portion of data. Also, for lower RAM devices, a smaller garbage collection buffer may be attractive. The system may also utilize a smaller shared volatile memory buffer area and reduce the number of XOR engine requirements due to the smaller size of the XOR stripe to facilitate a hybrid push-pull garbage collection operation on a source block. The push-pull data management system and technique can allow memory systems to use one XOR buffer for multiple source/destination GC pairs.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A method for managing data in a memory system, the method comprising:
   receiving host data writes at the memory system, the memory system having a controller in communication with a plurality of non-volatile memory sub-drives;
   detecting a garbage collection trigger for a first sub-drive in the plurality of sub-drives;
   in response to detecting the garbage collection trigger, selecting a source block in the first sub-drive having valid data and obsolete data; and
   sorting the valid data by data type from the source block into at least one other of the plurality of sub-drives, the sorting comprising:
      copying a predetermined amount of valid data of a first data type from the source block to a volatile memory;
      generating large data chunk correction data for the predetermined amount of valid data in the volatile memory;
      copying the predetermined amount of valid data and the large data chunk correction data from the volatile memory to a sub-drive of the plurality of sub-drives predetermined to receive all data of the first data type; and
      only after copying the predetermined amount of valid data and the large data chunk correction data from the volatile memory, copying a next predetermined amount of valid data of a single data type from the source block to the volatile memory.

2. The method of claim 1, wherein the single data type is a same data type as the first data type.

3. The method of claim 1, wherein the single data type is a different data type than the first data type.

4. The method of claim 1, wherein generating large data chunk correction data comprises calculating exclusive OR (XOR) data for the predetermined amount of valid data.

5. The method of claim 1, wherein generating large data chunk correction data and copying the predetermined amount of valid data and the large data chunk correction data comprise:
   appending the large data chunk correction data to the predetermined amount of valid data of the first data type to generate a protected stripe of data; and
   writing the protected stripe of data from the volatile memory to an open relocation block in the sub-drive of the plurality of sub-drives predetermined to receive all data of the first data type.

6. The method of claim 5, wherein the open relocation block comprises a superblock, the superblock comprising:
   a plurality of blocks configured to receive valid data; and
   a large data chunk correction block configured to receive the large data chunk correction data corresponding to the valid data received in the plurality of blocks.

7. The method of claim 6, wherein:
   the predetermined amount of valid data comprises a number of pages of valid data equal to a total number of the plurality of blocks configured to receive valid data in the superblock; and
   generating large data chunk correction data for the predetermined amount of valid data in the volatile memory comprises calculating exclusive OR (XOR) data for the predetermined amount of valid data.

8. The method of claim 1, wherein:
   the first sub-drive comprises a staging sub-drive configured to initially receive all host data, regardless of data type; and
   receiving host data writes comprises receiving host data writes at only the staging sub-drive.

9. The method of claim 8, wherein detecting the garbage collection trigger comprises detecting that an overprovisioning level of the staging sub-drive exceeds a predetermined threshold.

10. A non-volatile memory system comprising:
    a non-volatile memory defining a plurality of sub-drives;
    a volatile memory shared by the plurality of sub-drives; and
    a controller in communication with the plurality of sub-drives and the volatile memory, the controller configured to:
       select a source block for a garbage collection operation from currently programmed blocks in one of the plurality of sub-drives;
       copy a predetermined amount of valid data of only a first data type from the selected source block to the volatile memory;
       generate large data chunk correction data for the predetermined amount of valid data;
       write the large data chunk correction data to a fixed-size buffer in the volatile memory;
       write the large data chunk correction data and the predetermined amount of valid data to a sub-drive exclusively associated with the first data type in the plurality of sub-drives to form a protected stripe of data;
       copy a next predetermined amount of valid data of only a single data type from the source block to the volatile memory only after writing the protected stripe of data to the sub-drive exclusively associated with the first data type; and
    wherein the controller is configured to sequentially, for each given predetermined amount of valid data of the single data type in the selected source block, write the given predetermined amount of valid data and large data chunk correction data generated for the given predetermined amount to the volatile memory, and write the given predetermined amount of valid data and large data chunk correction data into an appropriate one of the plurality of sub-drives based on a respective data type of the given predetermined amount of valid data.

11. The non-volatile memory system of claim 10, wherein the source block comprises:
    a superblock having a fixed plurality of blocks of host data; and
    a block of large data chunk correction data.

12. The non-volatile memory system of claim 11, wherein the large data chunk correction data is exclusive OR (XOR) data.

13. The non-volatile memory system of claim 10, wherein the non-volatile memory comprises a substrate formed with a three-dimensional memory structure.

14. The non-volatile memory system of claim 10, wherein the fixed-size buffer has a fixed size corresponding to a size of the large data chunk correction data for the predetermined amount of valid data.

15. The non-volatile memory system of claim 12, wherein the protected stripe comprises:
    a number of pages of valid host data of the single data type corresponding to a number of the fixed plurality of blocks of host data; and
    a page of XOR data for the number of pages of valid host data of the single data type.

16. The non-volatile memory system of claim 15, wherein the fixed-size buffer has a fixed size equal to the page of XOR data.

17. A non-volatile memory system comprising:
    a non-volatile memory defining a plurality of sub-drives, wherein a portion of each sub-drive of the plurality of sub-drives comprises an open relocation block;
    a single garbage collection buffer in a volatile memory, the single garbage collection buffer having a total buffer capacity less than a total relocation capacity of any open relocation block;
    means for copying, during a garbage collection operation, a predetermined amount of valid data of a first data type from a source block to the single garbage collection buffer;
    means for generating exclusive OR (XOR) data for the predetermined amount of valid data in the single garbage collection buffer; and
    means for writing the predetermined amount of valid data and the XOR data from the single garbage collection buffer to the open relocation block of a sub-drive of the plurality of sub-drives predetermined to receive all data of the first data type and, only after copying the predetermined amount of valid data and the XOR data from the single garbage collection buffer, copying a next predetermined amount of valid data of a single data type from the source block into the single garbage collection buffer.

18. The non-volatile memory system of claim 17, wherein the open relocation block comprises:
    a superblock comprising a plurality of blocks configured to receive relocated host data; and an XOR block configured to receive XOR data generated for the relocated host data.

19. The non-volatile memory system of claim 18, wherein:
- a sum of the predetermined amount of valid data and an amount of XOR data generated for the predetermined amount of valid data is equal to the total buffer capacity;
- wherein the predetermined amount of valid data comprises a number of pages of host data equal to a number of the plurality of blocks; and
- the amount of XOR data is equal to a page of the XOR block.

20. The non-volatile memory system of claim 19, wherein:
- one of the plurality of sub-drives comprises a staging sub-drive configured to initially receive all incoming host data; and
- the source block comprises a block of the staging sub-drive.

* * * * *